US007061912B1

(12) United States Patent
Anandakumar et al.

(10) Patent No.: US 7,061,912 B1

(45) Date of Patent: Jun. 13, 2006

(54) METHOD AND APPARATUS OF PACKET LOSS CONCEALMENT FOR CVSD CODERS

(75) Inventors: Krishnasamy Anandakumar, San Diego, CA (US); Jonathon Cheah, San Diego, CA (US)

(73) Assignee: Microtune (San Diego) , Inc., San Diego, CA (US)

(*) Notice: Subject to any disclaimer, the term of this patent is extended or adjusted under 35 U.S.C. 154(b) by 946 days.

(21) Appl. No.: 10/052,311

(22) Filed: Jan. 17, 2002

(51) Int. Cl.
*H04L 12/56* (2006.01)

(52) U.S. Cl. ........................................ 370/392; 370/465

(58) Field of Classification Search ................ 370/392, 370/465, 352, 401
See application file for complete search history.

(56) References Cited

U.S. PATENT DOCUMENTS

| | | | | |
|---|---|---|---|---|
| 6,085,252 | A * | 7/2000 | Zhu et al. | 709/231 |
| 6,201,834 | B1 * | 3/2001 | Zhu | 375/240.27 |
| 6,490,705 | B1 * | 12/2002 | Boyce | 714/776 |
| 6,574,218 | B1 * | 6/2003 | Cooklev | 370/352 |
| 6,671,292 | B1 * | 12/2003 | Haartsen | 370/521 |
| 6,895,019 | B1 * | 5/2005 | Gibson et al. | 370/473 |

FOREIGN PATENT DOCUMENTS

| | | |
|---|---|---|
| WO | WO 00/63881 | 10/2000 |
| WO | WO 01/93488 A1 | 12/2001 |

OTHER PUBLICATIONS

ITU Telecommunication Standardization Sector, Document AC-99-27, Study Group 16, Q.19-21/16 Rapporteur Meeting, Geveva, Sep. 27-29, 1999, 18 pages.

Ondria J. Dvorak, The Effect of Waveform Substitution on the Quality of PCM Packet Communications, IEEE Translation on Acoustics, Speech, and Signal processinv, vol. 36 No. 3, Mar. 1988, 7 pages.

Liu et al., "A Packet-Based CAPDM Speech Coder for PCN Applications," IEEE Transactions on Vehicular Technology, vol. 49, No. 3, pp. 753-765, May 2000.

PCT Search Report for PCT/US 03/01308, 7 pages, May 14, 2003.

* cited by examiner

*Primary Examiner*—Andrew C. Lee
(74) *Attorney, Agent, or Firm*—Baker Botts L.L.P.

(57) ABSTRACT

An apparatus and methods for concealing missing packets in a CVSD bit stream are disclosed. In one embodiment, an indication from a packet loss indicator (PLI) that a packet is missing is received. Next the status of the missing packet is determined. Based on the status of the missing packet, a sample packet is generated to replace the missing packet, and a memory of the CVSD is updated. A compressed copy of the sample packet may be stored in a first memory buffer in either μ-law or a-law format.

19 Claims, 3 Drawing Sheets

METHOD AND APPARATUS OF PACKET LOSS CONCEALMENT FOR CVSD CODERS

FIELD OF THE INVENTION

The present invention relates to electronic communication devices and more particularly to electronic or digital voice communication devices that conceal packets of audio data missing from continuous variable slope delta modulation (CVSD) bit streams.

BACKGROUND OF THE INVENTION

A voice communication system includes two or more electronic or digital communication devices that are wirelessly or physically coupled to each other. Generally, one of the communication devices includes a transmitter that encodes and packetizes audio data such as speech, and transmits the encoded audio data to a receiver included in a second communications device. At the receiver, packets are received and decoded. Uncorrupted packets are routed directly to an audio output such as a speaker system. Corrupted packets whose access code, header information, or data bits have been garbled during transmission are declared as missing. The corrupted packets create gaps in the reproduced speech, which may be treated as silent intervals or concealed. Treating the gaps as silent intervals requires no signal processing at the receiver. However, the resulting gaps in the reproduced speech are audible and disturbing to the listener.

Alternatively, the gaps in reproduced speech may be covered using packet loss concealment (PLC) techniques. These techniques use various algorithms to generate a synthetic speech signal that has the same timbre and other characteristics as the missing signal. The synthetic speech signal is then inserted into the appropriate gap and blended with speech information that is on either side of the gap to provide reproduced speech that contains no silent intervals.

The PLC technique of waveform substitution examines received packets for waveform segments that resemble the waveforms of the missing packets. When a match or matches occur, the waveform segment(s) are inserted into the gaps to conceal the missing packet. Another technique, known as packet repetition, uses the most recently received packet to generate a reasonable approximation of the missing packet. Advantages of packet repetition are that it requires virtually no signal processing, and that the amount of required speech storage is limited to one packet. A third technique, based on pattern matching, replaces missing packets with packet length segments, extracted from the received speech. A fourth technique estimates the pitch of the received speech and replicates prior pitch waveforms for the duration of the gap. When desirable to maintain phase continuity at the boundaries of substitution packets and prior received packets, the techniques of pitch waveform replication, and pattern matching are preferred over packet repetition.

A significant drawback is that current PLC techniques are limited to pulse code modulation (PCM) coders. Few, if any, PLC techniques have been adapted or developed for continuous variable slope delta modulation (CVSD) coders.

SUMMARY OF THE INVENTION

An apparatus and methods for concealing missing packets in a CVSD bit stream are disclosed. In one embodiment, an indication from a packet loss indicator (pli) that a packet is missing is received. Next the status of the missing packet is determined. Based on the status of the missing packet, a sample packet is generated to replace the missing packet, and a memory of the CVSD decoder is updated. A compressed copy of the sample packet may be stored in a memory buffer of the decoder in either μ-law or a-law format.

BRIEF DESCRIPTION OF THE DRAWINGS

Various aspects of the present invention are set forth by way of example, and not limitation, in the figures of the accompanying drawings, in which.

DETAILED DESCRIPTION

An apparatus and method for concealing packet loss in CVSD bitstreams are disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, or processes have not been shown or described in detail in order not to unnecessarily obscure the present invention.

Reference is made to the accompanying drawings in which like references indicate similar elements, and in which is shown by way of illustration, specific embodiments in which the invention may be practiced. These embodiments are described in sufficient detail to enable those skilled in the art to practice the invention. The following detailed description is, therefore, not to be taken in a limiting sense, and the scope of the invention is defined only by the appended claims.

Unless specifically stated otherwise, as apparent from the following discussions, it is appreciated that throughout the detailed description discussions utilizing terms such as "processing," "computing," "calculating," "determining," or the like, refer to the action and/or processes of a computer or computing system, or similar electronic computing device. Such a device manipulates and/or transforms data represented as physical, such as electronic quantities within the computing system's registers and/or memories into other data similarly represented as physical quantities within the computing system's memories, registers or other such information storage, transmission or display devices.

The present invention may be provided as a computer program product, or software, that may include a machine-readable medium having stored thereon instructions, which may be used to program a computer system (or other electronic devices) to perform a process according to the present invention. The machine-readable medium may be, but is not limited to, any type of disk including floppy disks, optical disk, CD-ROMs, and magnetic-optical disks. The machine-readable medium may also be, but is not limited to, read-only memories (ROMs), random access memories (RAMs), electrically programmable read only memories (EEPROMs), magnetic or optical cards, or any other type of media suitable for storing electronic instructions, and capable of being coupled to a system bus for a computing device.

Figure 1:
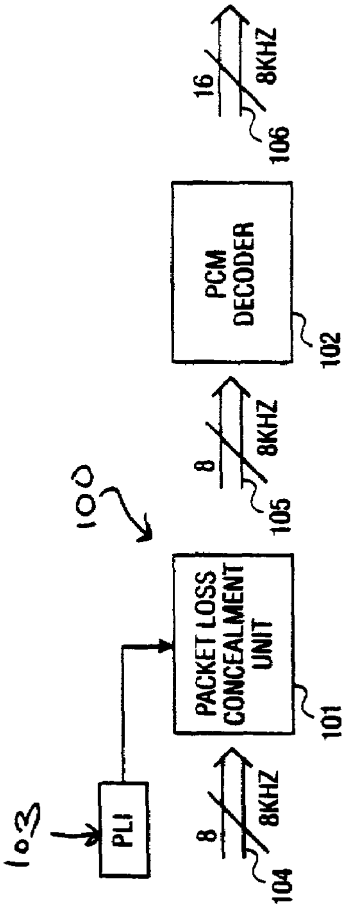
FIG. 1 is a block diagram of a conventional block concealment method, usable with a pulse code modulation (PCM) decoder.

FIG. 1 is a block diagram illustrating a traditional packet loss concealment method 100, usable with a pulse code modulation (PCM) decoder 102. Pulse code modulation is a sampling technique for digitizing analog audio signals. An analog signal is a signal that has a continuous rather than a pulsed or discrete nature. In PCM, each signal is sampled 8000 times per second (8 kHZ). Additionally, each sample is represented by eight bits for a total group rate of 64 Kbps. The sample may be encoded using any existing type of coding standards. The well known μ-law standard is mostly used in North America, while the a-law standard is used most in other countries.

As used herein, the terms "coding," "coded," and "decoded" refer to the altering of the characteristic of the signal to make the signal more suitable for an intended application. For example, the signal may be optimized for transmission. Alternatively, the signal's transmission quality fidelity may be increased. Additionally, the signal may be altered in other ways. The terms "decoder" and "encoder" refer to a device that decodes or encodes, respectively, signals applied thereto. Additionally, the term "coding" further includes digital encoding of the analog signal, and conversely, decoding the digital signal to an analog signal.

In method 100, data for data stream 104 enters a packet loss concealment unit 101, which is activated to conceal missing data packets whenever the packet loss indicator 103 signals that a packet is missing. The concealed data packets are output from the packet loss concealment unit 101 in either μ-law or a-law format at data stream 105, which feeds a PCM decoder 102 that process data stream 105 and provides speech output 106.

Figure 2:
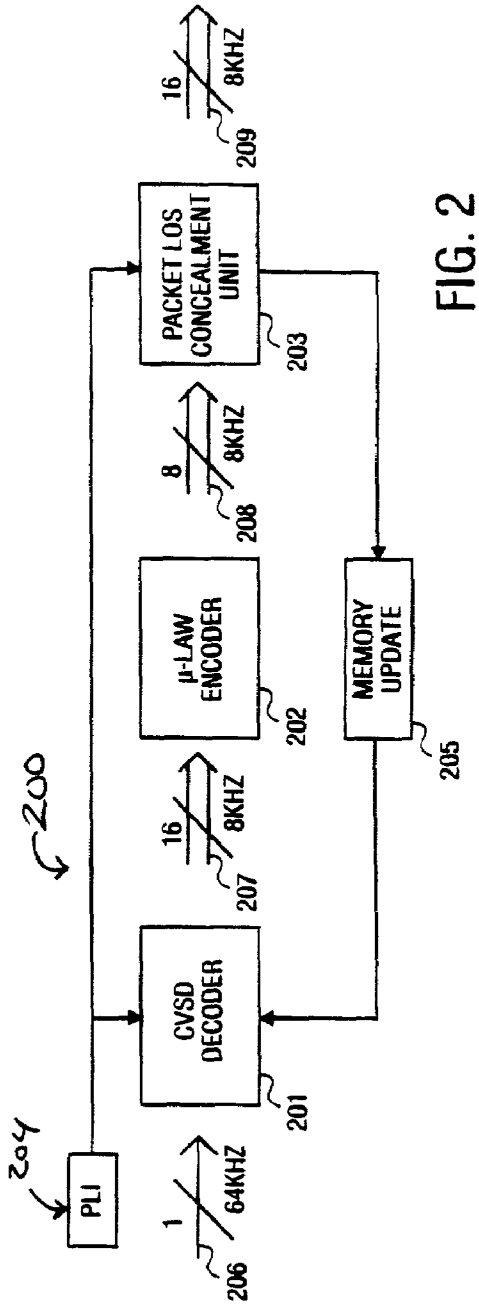
FIG. 2 is a block diagram of a packet loss concealment method usable with a CVSD decoder, according to one embodiment of the invention.
Figure 3:
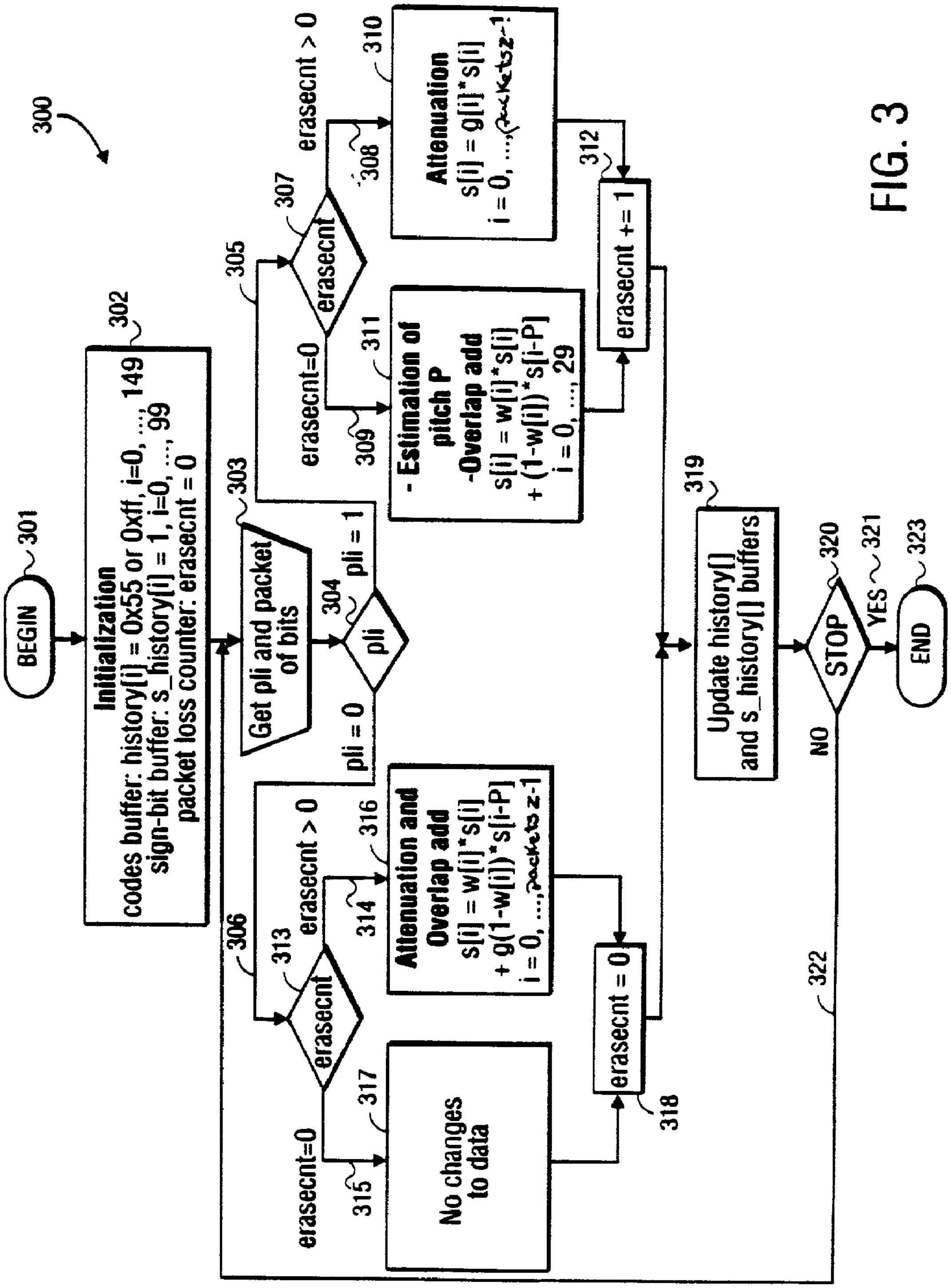
FIG. 3 is a flow chart illustrating a method of packet loss concealment usable with the PCM decoder of FIG. 1.

FIG. 2 is described below. Referring briefly now to FIG. 3, there is illustrated a method 300 usable with the PCM decoder 102 of FIG. 1. In FIG. 3, the term "pli" means packet loss indicator. The term "erasecnt" means packet loss counter, and the term "packetsz" means packet size.

Method 300 begins, block 301, by initializing one or more codes buffers, block 302. Next, a packet loss indicator, a packet loss counter, and a packet counter are initialized, block 302. In one embodiment, the value output by the packet loss indicator equals zero if the current packet is not lost and equals one if the current packet is lost. Similarly, the value counted by the packet loss counter (erasecnt) is set to zero if the previous packet is not loss and is set to one if the previous packet is lost.

If the current packet is not lost (pli=0), path 306 is taken and a check is made, step 313, to determine whether the previous packet was lost. If the previous packet is not lost (erasecnt=0), path 315 is taken, and the packet loss concealment unit (PLC) 101 simply passes the received packet through without making any changes to the data, block 317. Thereafter, a value output by a packet loss counter is set to zero, step 318, and various history buffers are updated, block 319. At decision point 320, method 300 may stop, path 321, and end, block 323. Alternatively, at decision point 320, method 300 may loop back, path 322, to block 303.

If a current packet is lost (pli=1), path 305 is chosen, and if the previous packet is not lost (erascnt=0), at step 307, path 309 is taken. At this point, the first pitch value (P) is estimated, block 311. Once the pitch value P is estimated, pitch synchronous repetition is performed with an overlap-add during the last eight samples of the previous packet, block 311. Specifically, the last eight samples of the previous packet are replaced using:

$$s[i]=w[i]*s[i]+(1-w[i])*s[i-P],$$

And the current packet is generated using:

$$s[i]=s[i-P],$$

where s[i] denotes speech samples and w[i] denotes weighting factors. An overlap-add technique combines successive, overlapping sections of a sequence by means of a weighted sum. With overlap-add, the replacement waveforms are longer than the missing packets, and the overlapping portions of previous packet and replacement waveform are combined by means of the weighted sum to give smooth transitions at the packet boundaries.

Thereafter, a value output by a packet loss counter is incremented by one, step 312, and various history buffers are updated, block 319. At decision point 320, method 300 may stop, path 321, and end, block 323. Alternatively, at decision point 320, method 300 may loop back, path 322 to block 303.

If the current packet is lost (pli=1), path 305 is selected, and if the previous packet is lost (erasecnt>0), path 308 is taken. At this point the current lost packet is generated using pitch synchronous repetition while applying attenuation, block 310, using:

$$s[i]=g*s[i-P],$$

where g denotes an attenuation factor. In one embodiment, pitch synchronous repetition involves computing the pitch period P, and then generating the replacement waveform consists of successive repetitions of the last P samples of received speech. In one embodiment, attenuation involves linear attenuation at a rate of 12.5% per 3.75 ms.

Thereafter, a value output by a packet loss counter is incremented by one, step 312; and various history buffers are updated, block 319. At decision point 320, method 300 may stop, path 321, and end, block 323. Alternatively, at decision point 320, method 300 may loop back, path 322, to block 303.

If the current packet is not lost (pli=0), path 306, but the previous packet is lost (erasecnt>0), path 314 is selected, and the entire current packet is replaced with an overlap-add function using samples from the current packet to generate the sample packet, block 316, using:

$$s[i]=w[i]*s[i]+g(1-w[i])*s[i-P].$$

Thereafter, a value output by a packet loss counter is set to zero, block 318 and various history buffers are updated, block 319. At decision block 320, method 300 may stop, path 321, and end, block 323. Alternatively, at decision point 320, method 300 may loop back, path 322, to block 303.

Referring back to FIG. 2, there is illustrated a block diagram that depicts a unique packet loss concealment method 200, usable with continuous variable slope delta modulation (CVSD) decoder 201. In method 200 data from the data stream 206 enters the CVSD decoder 201, which decodes the signal and outputs data stream 207 to μ-law encoder (or a-law encoder) 202 for μ-law encoding (or a-law encoding). The μ-law encoder 202 outputs data stream 208 to a packet loss concealment unit 203, which is activated to conceal missing data packets whenever the packet loss indicator 204 signals that a packet is missing. The concealed data packets are output to the packet loss concealment unit 203 in either μ-law or a-law format at data stream 209. If no packets are missing, the data stream 208 passes through the PLC unit 203 without modification, at output data stream 209. Additionally, the PLC unit 203 updates the memory 205 (e.g. internal states such as an accumulator delay line) of the CVSD decoder 201 whenever the PLC unit 203 generates a replacement output for any lost data packets. Additionally, the PLC unit 203 may store the samples in either μ-law or a-law format.

Figure 4:
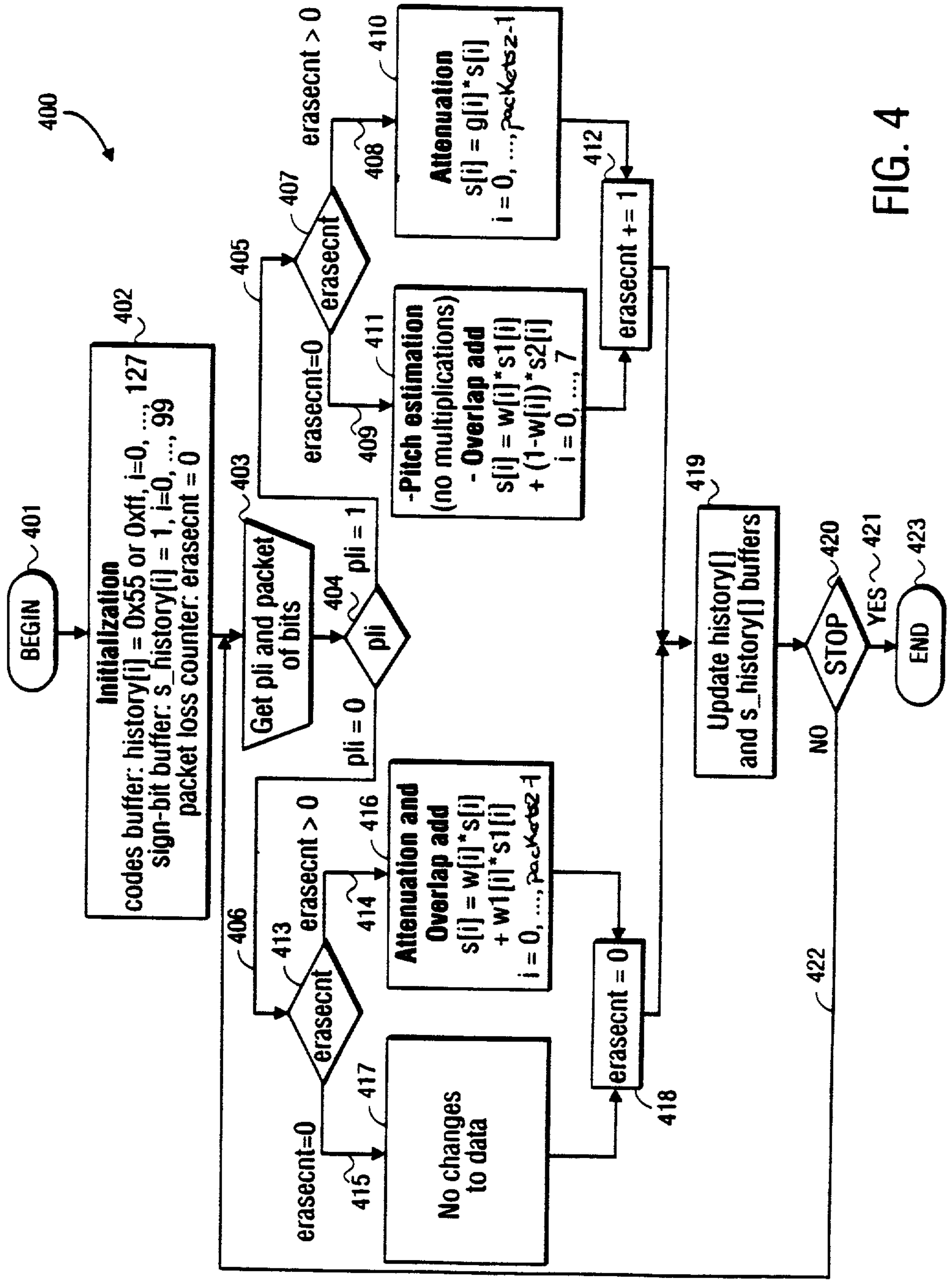
FIG. 4 is a flow chart illustrating a method of packet loss concealment usable with the CVSD decoder of FIG. 2.

Referring now to FIG. 4, there is illustrated a method 400 usable with the CVSD decoder 201 in FIG. 2. In FIG. 4, the term "pli" stands for packet loss indicator. The term "erasecnt" means packet loss counter. And, the term "packetsz" stands for packet size.

Method 400 begins, block 401, by initializing one or more codes buffers, block 402. Next, a packet loss indicator, packet loss counter, and packet counter are initialized, block 402. In one embodiment, the value output by the packet loss indicator equals zero if the current packet is not lost, and equals one if the current packet is lost. Similarly, the value output by the packet loss counter (erasecnt) is set to zero if the previous packet is not lost, and is set to one if the previous packet is lost.

If the current packet is not lost (pli=0), path 406 is taken, and a check is made, step 413 to determine whether the previous packet was lost. If the previous packet is not lost (erasecnt=0), path 415 is taken, and the packet loss concealment unit (PLC) 203, simply passes the received packet through without making any changes to the data, block 417.

Thereafter, a value output by a packet loss counter is set to zero, step 418; and various history buffers are updated, block 419. At decision point 420, method 400 may stop, path 421, and end, block 423. Alternatively, at decision point 420, method 400 may loop, back, path 422, to block 403.

If a current packet is lost (pli=1), path 405 is chosen, and if the previous packet is not lost (erasecnt=0), step 407; path 409 is taken. At this point, the pitch value P is estimated, using a sign-based cross-correlation algorithm in order to reduce the computational complexity, block 411. One embodiment of sign-based cross correlation algorithm may include:

$$P = \max_{n} \sum_{i} \mathrm{sign}(s[i]) * \mathrm{sign}(s[i-n]).$$

In one embodiment, a separate sign buffer is used to store the sign values used in the computation of the pitch estimate P. The sign buffer is represented in FIG. 4 as s_history buffer, block 419.

Once the pitch value P is estimated, pitch synchronous repetition is performed with an overlap-add method during the last eight samples of the previous packet, block 411. Specifically, the last eight samples of the previous packet are replaced using:

$$s[i]=w[i]*s[i]+(1-w[i])*s[i-P],$$

and the current loss packet is generated using:

$$s[i]=s[i-P],$$

where s[i] denotes speech samples and w[i] denotes weighting factors.

In one embodiment, memory requirements are reduced by compressing the samples used in the pitch synchronous repetition process into either μ-law or a-law format. The compressed samples are then stored in a sample buffer, represented by the history buffer in block 419. In one embodiment, an overlap-add technique combines successive overlapping sections of a sequence by means of a weighted sum. With an overlap-add, the replacement waveform is longer than the missing packet, and is combined with the overlapping portions of previously received packet by means of a weighted sum.

Thereafter, a value output by a packet loss counter is incremented by one, block 412; and various history buffers are updated, block 419. At decision point 420, method 400 may stop, path 421, and end, block 423. Alternatively, at decision point 420, method 400 may loop back, path 422, to block 403.

If the current packet is lost (pli=1), path 405, and the previous packet is lost (erasecnt>0), path 408 is chosen; and the current lost packet is generated using pitch synchronous repetition while applying attenuation, block 410, using:

$$s[i]=g*s[i-P],$$

where g denotes an attenuation factor. Thereafter, a value output by a packet loss counter is incremented by one, block 412; and various history buffers are updated, block 419. At decision point 420, method 400 may stop, path 421, and end, block 423. Alternatively, at decision point 420, method 400 may loop back, path 422, to block 403.

If the current packet is not lost (pli=0) path 406, but the previous packet is lost (erasecnt>0), block 413, path 414, the entire current packet is replaced with an overlap-add function using samples from the current packet to generate the sample packet, block 416, using:

$$s[i]=w[i]*s[i]+g(1-w[i])*s[i-P].$$

Thereafter, a value output by a packet loss counter is set to zero, block 418; and various history buffers are updated, block 419. At decision point 420, method 400 may stop, path 421, and end, block 423. Alternatively, at decision point 420, method 400 may loop back, path 422, to block 403.

In one embodiment, the CVSD decoder is compatible with the specifications set forth in Version 1.1 of the Bluetooth Specification, which is herein incorporated by reference. Alternatively, the CVSD decoder is compatible with specifications set forth in future versions of the Bluetooth Specification, which are also herein incorporated by reference.

Thus, a method and apparatus of packet loss concealment for CVSD coders is disclosed. Although the present invention is described herein with reference to a particular embodiment, many modifications and variations therein will readily occur to those with ordinary skill in the art. Accordingly, all such variations and modifications are included within the intended scope of the present invention as defined by the following claims.

What is claimed is:

1. A method of concealing missing packets in a CVSD packet stream, the method comprising:

receiving an indication from a packet loss indicator that a packet is missing;

determining a status of the missing packet by:

determining that a current packet is missing; and determining that a previous packet, which immediately precedes the current packet, is not missing;

generating a sample packet to replace the missing packet by:

storing a sign value to be used in estimating a pitch value in a second buffer;

estimating a pitch value using a sign based cross correlation algorithm; and performing pitch synchronous repetition with an overlap-add function using samples of the previous packet to produce the sample packet; and storing a compressed copy of the sample packet in a first memory buffer.

2. A method as in claim 1, wherein the compressed copy of the sample packet is stored in the first memory buffer in μ-law format.

3. A method as in claim 1, wherein the compressed copy of the sample packet is stored in the first memory buffer in a-law format.

4. An apparatus for concealing packets missing in a CVSD data stream, the apparatus comprising:

means for decoding the CVSD data stream, the means for decoding the CVSD data stream comprising means for receiving an indication from a packet loss indicator that a packet is missing in the CVSD data stream;

means for storing a compressed copy of a sample packet coupled to the means for decoding the CVSD data stream;

means for compressing the sample packet coupled to the means for storing the compressed copy of the sample packet; and means for generating a sample packet to replace the packet missing in the CVSD data stream, the means for generating a sample packet coupled to the means for compressing the sample packet, and comprising means for determining a status of the missing packet, the means for generating a sample packet further comprising means for updating the means for storing a compressed copy of a sample packet whenever a sample is generated;

wherein the means for determining the status of the missing packet further comprises:

means for determining whether or not the missing packet is a current packet; and means for determining whether or not a previous packet immediately preceding the current packet is missing coupled to the means for determining whether or not the missing packet is a current packet;

wherein when the means for determining the status of the missing packet determines that the missing packet is the current packet and that the previous packet is not missing, the means for generating the sample packet to replace the missing packet, is configured to:

store a sign value to be used in estimating a pitch value in a second buffer;

estimate the pitch value using a sign based cross correlation algorithm; and perform pitch synchronous repetition with an overlap-add function to generate the sample packet.

5. An electronic communication device, comprising:

a CVSD decoder coupled to receive and decode CVSD encoded packets of audio data within a CVSD bitstream;

an encoder coupled to the CVSD decoder and configured to encode sample replacement packets in μ-law or a-law format;

a packet loss concealment (PLC) unit coupled to the encoder, and configured to pass uncorrupted ones of the received packets to an audio output unit, and to generate sample packets to replace missing ones of the received packets;

a packet loss indicator (PLI) coupled to the CVSD decoder and to the PLC, the PLI configured to determine that ones of packets are missing from the CVSD bitstream, the PLI further configured to output a signal having a value of zero if a current packet is missing and to output a signal having a value of one if a current packet is not missing;

a first memory buffer coupled to the CVSD decoder and configured to store sample packets of audio data used in pitch synchronous repetition; and a second memory buffer coupled to the CVSD decoder and configured to store sign values to be used in an estimation of pitch value.

6. An electronic communication device as in claim 5, wherein the PLC unit is further configured to update the first and second memory buffer when a sample packet of audio data is generated.

7. An electronic communication device as in claim 5, wherein the sample packets of audio data, stored in the first memory buffer, are stored in compressed μ-law format.

8. An electronic communication device as in claim 5, wherein the sample packets of audio data, stored in the first memory buffer, are stored in compressed a-law format.

9. An electronic communication device as in claim 5, wherein when the packet loss indicator determines that the missing packet is the current packet and that a previous packet is not missing, packet loss concealment unit is configured to:

store a sign value to be used in estimating a pitch value in a second buffer;

estimate the pitch value using a sign-based cross-correlation algorithm; and perform pitch synchronous repetition with an overlap-add function using samples from the previous packet to generate the sample packet.

10. An electronic communication device as in claim 5, wherein when the packet loss indicator determines that the current packet is not missing and that a previous packet is missing, the packet loss concealment unit is configured to:

store a sign value to be used in estimating a pitch value in a second buffer;

estimate the pitch value using a sign-based cross-correlation algorithm; and replace the entire current packet with an overlap-add function using samples from the current packet to generate the sample packet.

11. An electronic communication device as in claim 5, wherein when the packet loss indicator determines that the current packet is missing and that a previous packet immediately preceding the current packet is missing, the packet loss concealment unit is configured to replace the missing packets using a pitch synchronous repetition method while applying attenuation.

12. A method of concealing missing packets in a CVSD packet stream, the method comprising:

receiving an indication from a packet loss indicator that a packet is missing;

determining a status of the missing packet by:

determining that the missing packet is a current packet; and determining that a previous packet, which immediately precedes the current packet, is missing;

generating a sample packet to replace the missing packet by performing pitch synchronous repetition while applying attenuation; and storing a compressed copy of the sample packet in a first memory buffer.

13. A method as in claim 12, wherein the compressed copy of the sample packet is stored in the first memory buffer in μ-law format.

14. A method as in claim 12, wherein the compressed copy of the sample packet is stored in the first memory buffer in a-law format.

15. A method of concealing missing packets in a CVSD packet stream, the method comprising:

receiving an indication from a packet loss indicator that a packet is missing;

determining a status of the missing packet by:

determining that a current packet is not missing; and determining that a previous packet, which immediately precedes the current packet, is missing;

generating a sample packet to replace the missing packet by replacing the current packet with an overlap-add function using samples of the previous packet to produce the sample packet; and storing a compressed copy of the sample packet in a first memory buffer.

16. A method as in claim 15, wherein the compressed copy of the sample packet is stored in the first memory buffer in μ-law format.

17. A method as in claim 15, wherein the compressed copy of the sample packet is stored in the first memory buffer in a-law format.

18. An apparatus for concealing packets missing in a CVSD data stream, the apparatus comprising:

means for decoding the CVSD data stream, the means for decoding the CVSD data stream comprising means for receiving an indication from a packet loss indicator that a packet is missing in the CVSD data stream;

means for storing a compressed copy of a sample packet coupled to the means for decoding the CVSD data stream;

means for compressing the sample packet coupled to the means for storing the compressed copy of the sample packet; and means for generating a sample packet to replace the packet missing in the CVSD data stream, the means for generating a sample packet coupled to the means for compressing the sample packet, and comprising means for determining a status of the missing packet, the means for generating a sample packet further comprising means for updating the means for storing a compressed copy of a sample packet whenever a sample is generated;

wherein the means for determining the status of the missing packet further comprises:

means for determining whether or not the missing packet is a current packet; and means for determining whether or not a previous packet immediately preceding the current packet is missing coupled to the means for determining whether or not the missing packet is a current packet;

wherein when the means for determining the status of the missing packet determines that the missing packet is a current packet, and that a previous packet immediately preceding the current packet is missing, the means for generating the sample packet is configured to perform pitch synchronous repetition while applying attenuation.

19. An apparatus for concealing packets missing in a CVSD data stream, the apparatus comprising:

means for decoding the CVSD data stream, the means for decoding the CVSD data stream comprising means for receiving an indication from a packet loss indicator that a packet is missing in the CVSD data stream;

means for storing a compressed copy of a sample packet coupled to the means for decoding the CVSD data stream;

means for compressing the sample packet coupled to the means for storing the compressed copy of the sample packet; and means for generating a sample packet to replace the packet missing in the CVSD data stream, the means for generating a sample packet coupled to the means for compressing the sample packet, and comprising means for determining a status of the missing packet, the means for generating a sample packet further comprising means for updating the means for storing a compressed copy of a sample packet whenever a sample is generated;

wherein the means for determining the status of the missing packet further comprises:

means for determining whether or not the missing packet is a current packet; and means for determining whether or not a previous packet immediately preceding the current packet is missing coupled to the means for determining whether or not the missing packet is a current packet;

wherein when the step of generating a sample to replace the missing packet determines that the current packet is not missing, and that a previous packet immediately preceding the current packet is missing, the means for generating the sample packet is configured to:

store a sign value to be used in estimating a pitch value in a second buffer;

estimate the pitch value using a sign based cross correlation algorithm; and replace the entire current packet with an overlap-add function using samples of the current packet to generate the sample packet.

* * * * *